United States Patent Office 3,329,206
Patented July 4, 1967

3,329,206
PROCESS FOR STORING NATURAL GAS
Hendrik K. van Poollen, 1088 W. Caley Ave.,
Littleton, Colo. 80120
No Drawing. Filed Dec. 29, 1964, Ser. No. 422,022
10 Claims. (Cl. 166—42)

This information relates to the underground storage of hydrocarbons and more particularly to the storage of natural gas in storage reservoirs having a water drive.

Many billions of cubic feet of natural gas are presently stored in underground reservoirs in the United States. This type storage, entailing millions of dollars in investments, is considerably cheaper than building pipelines to distant gas sources competent to handle peak winter user loads.

Generally, storage operations are conducted in two types of reservoirs. Reservoirs that originally contained fresh or saline water are the first type. These reservoirs are commonly referred to as aquifers. The Herscher reservoir in Kankakee County, Ill., is an example of this type of reservoir. The remaining type of reservoirs originally contained oil, gas, or both, along with water.

Presently, when gas is injected into a water-bearing formation, the gas bubble displaces the water downdip. However, a certain residual water saturation remains in the rock. Quite often the available volume of reservoir space is considerably reduced by this remaining water.

The injection of a slug of a fluid miscible with both the water in the formation and with the injected gas has been suggested. (See United States Patent 3,275,078.) The use of such a slug would cause the water to be substantially swept from the formation, thereby allowing more storage space when gas is later injected. The injected miscible fluid bank is, however, destroyed as the gas bubble is enlarged in the summer and reduced in the winter by storage and consumption, respectively. Mixing occurs at the water-miscible fluid bank interface and gradually destroys the bank. On destruction of the bank, water again imbibes into the rock surfaces and reduces storage volume.

I have now discovered that this prior art process can be improved by a process wherein the formation is made preferentially oil wet. The material for preferentially oil wetting the reservoir can be utilized alone or in conjunction with a miscibilizing material. The miscibilizing material can be injected before, after, or together with the material for oil wetting the gas storage reservoir.

A number of methods are known for rendering subterranean formations preferentially oil wet. Many of these processes were developed to ameliorate the problem of high water cuts which sometime occur during oil production. Though these processes were intended for wetting the portion of the formation adjacent producing wells only, they are adaptable for rendering large formations oil wet. United States Patents 2,469,354 and 2,633,919 teach processes wherein formation reservoir surfaces are treated with a silicone halide, which is hydrolyzed to form a silicone polymer on the surfaces of the formation. United States Patent 2,846,012 teaches the injection of a water-soluble metal salt of an organic siliconic acid. The subterranean formation is thereafter acidized. Reissue Patent 21,916 teaches a process wherein salts of sulfonated fats or fatty acids are injected in to a formation. Alkaline earth metal salts precipitate the sulfonated material on the rock surface. In the process of United States Patent 2,246,726, an alkaline polyphosphate solution is injected prior to sulfonate treatment to enhance the effectiveness of the sulfonate treatment.

Subterranean formations can also be oil wetted by surfactant compounds utilized in the flotation of silica, feldspar, and the like. Quaternary ammonium salts, sold by Armour & Company under the mark "Arquards," are suitable for this purpose. Arquard 18–50, which is primarily octadecyltrimethylammonium chloride, and Arquard 2 HT–75, preponderantly dioctadecyldimethylammonium chloride, are preferred for this purpose.

The amount of material required to oil wet a particular subterranean formation will depend on the number of variables. These include formation porosity, the chemical composition and physical configuration of the oil wetting material used, and the amount and degree of oil wetting in the formation. Normally, only one substance which will preferentially oil wet a formation is required, though combinations of oil-wetting materials may be used. Generally, the use of oil soluble petroleum and vegetable sulfonates to oil wet gas reservoir formations is preferred. Ideally, the sulfonates are transported in a medium which both aids in the deposition of the sulfonate on the formation rock surfaces and miscibilizes the natural gas and water.

Concentrated solutions of oil soluble sulfonates and, where necessary, cosolvents in hydrocarbons are ideal for this purpose, as the hydrocarbon solutions tend to take up any oil not displaced and to emulsify water. This type deposition provides a more uniform precipitation of sulfonate on the rock surfaces when aqueous solutions of heavy metal salts, such as calcium and barium salts, are injected into the formation to precipitate the sulfonate on the rock surfaces. Such ideal solutions preferably contain in excess of about 5–10% oil-soluble sulfonate and preferably contain from about 8 to about 20% sulfonate, by weight. Light ends are the preferred hydrocarbon solvent, and isopropanol is a preferred cosolvent for such solutions. Other alcohols, ketones, etc., are also useful cosolvents.

Generally, from about 5 to about 30% of the pore volume of the formation of sulfonate solution is required to thoroughly coat the rock surfaces of a formation. The percentage required for this purpose varies with the volume of the reservoir to be treated and the sulfonate concentration of the solution. In small reservoirs—for example, 5 acres—upwards of 10% sulfonate solution, or other solution, is required while in large reservoirs—for example, a 40-acre formation—only 5% of the pore volume of material might be required.

While substantially improved results can be obtained through preferentially wetting the rock surfaces in a permeable gas storage reservoir, the process of this invention can be utilized with the miscibilizing processes of the prior art. Thus, while the use of a substantially anhydrous "soluble oil," as outlined above, tends to both oil wet the formation and act as a miscibilizing system, other miscibilizing substances can also be used in the process of this invention. Preferably, the miscibilizing substance is injected into the formation after the injection of the material(s) for preferably oil wetting the reservoir. These substances are at least partially miscible with the natural gas to be stored and with the fluids in the formation. A slug of light ends; i.e., propane, butane, etc., may be injected into the formation to improve the miscibility continuum between the water in the formation and the stored gas.

Substances partially miscible with the material used to oil wet the formation and with the natural gas or light ends include the lower molecular weight alcohols, amides, ketones, and the like. While isopropanol alcohol is preferred, any material which is inert to the material used to oil wet the formation rock surfaces, and with the natural gas can be used. This substance is injected in amounts ranging from about 2 to about 20% of the pore volume of the formation. Normally, a volume equivalent to from about 5 to about 10% of the pore volume is required. The amount utilized varies with the area of the maximum natural gas-water interface. Normally, the thickness at the maximum interface can be from about 5 to about 100 feet, though from about 10 to about 20 feet is preferred.

The following example more fully illustrates my invention. However, it is not intended that may invention be limited by the surfactants used, slug size, etc. Rather, it is intended that all equivalents obvious to those skilled in the art be included within the scope of my invention as claimed.

*Example I*

A sandstone dome at a depth of 2400 feet is chosen for gas storage. The reservoir is a water-wet sandstone having a porosity of 15–18% and a vertical section of about 100 feet at the maximum. The formation is fed by a 1032 p.s.i. water drive. A 150,000-barrel slug of 0.1% solution of sodium hexametaphosphate in connate water is first injected to prevent precipitation of alkaline earth metal salts present in the reservoir. This solution is buffered to pH 8.5 with sodium pyrophosphate. A 500,000-barrel condensate slug containing 4% isopropanol and 6% of an alkylaryl naphthenic monosulfonate having a molecular weight of about 470 is then injected into the formation. This slug is followed by a 25,000-barrel slug of 3% calcium chloride, which reacts with the sulfonate to precipitate calcium sulfonate salts on the formation rock as the slugs are displaced downwardly. A slug of 500,000 barrels of isopropanol is then injected into the formation. Finally, dry gas injection is initiated at 1500 p.s.i., displacing the previously injected slugs downwardly through the formation.

Now having described my invention, what I claim is:

1. The process comprising injecting into a permeable subterranean formation a solution of an oil-soluble alkali metal sulfonate in hydrocarbon, injecting into said formation solutions containing soluble alkaline earth metal salts to precipitate an alkaline earth metal sulfonate on the rock surfaces of said formation, injecting a miscibilizing material into said formation and thereafter injecting gaseous hydrocarbon into said formation.

2. The process of claim 1 wherein a volume of miscibilizing material equivalent to from about 5 to about 10% of the pore volume of the formation is injected into said formation.

3. In a process for the storage of gaseous hydrocarbons in gas-confining subterranean formations having an aquifer wherein a fluid bank is injected into the formation prior to a repeated injection of gaseous hydrocarbon into the formation for storage, storage of the gaseous hydrocarbon and withdrawal of gaseous hydrocarbon from storage in response to ambient supply and demand; the improvement comprising injecting an amount of material(s) which interact(s) to render the formation in which gas is to be stored substantially oil-wet.

4. The process of claim 3 wherein a miscibilizing material is injected in the said formation prior to the injection of the gaseous hydrocarbon.

5. The process of claim 4 wherein the bank contains a solution of at least one substance rendering the rock surfaces in said formation preferentially oil wet in solution in a solvent, the solution being adapted to dissolve hydrocarbons, where present in said formation, and emulsify water in said formation and to dissolve injected gaseous hydrocarbons and an aqueous metal salt solution is injected which reacts with the sulfonate and forms an oil-wetting precipitate on the rock surface.

6. The process of claim 5 wherein said solutions contain in excess of about 5–10% oil-soluble sulfonate.

7. The process of claim 5 wherein the solutions contain from about 8 to about 20% sulfonate, by weight.

8. The process of claim 5 wherein a volume of from about 5 to about 30% of the pore volume of the formation of sulfonate solution is injected into said formation.

9. The process of claim 4 wherein the bank contains an amount of quaternary ammonium compounds effective to substantially preferentially oil wet the rock surfaces of said formation and thereafter injecting gaseous hydrocarbon into said formation.

10. The process of claim 4 wherein the bank contains a material which, of itself, is inert to the formation, and prior to injection of the gas to be stored injecting into said formation a material which, on combination with said first injected material, precipitates on the rock surfaces of said formation a material which preferentially oil wets the surfaces of said formation.

References Cited

UNITED STATES PATENTS

| | | | |
|---|---|---|---|
| 3,111,985 | 11/1963 | Reisberg | 166—9 |
| 3,163,214 | 12/1964 | Csaszar | 166—9 |
| 3,167,119 | 1/1965 | Meadors | 166—9 |
| 3,196,944 | 7/1965 | Bernard | 166—9 |

CHARLES E. O'CONNELL, *Primary Examiner.*

N. C. BYERS, *Assistant Examiner.*